H. WHITMAN.
Corn Planter.

No. 21,287.

2 Sheets—Sheet 1.

Patented Aug. 24, 1858.

H. WHITMAN.
Corn Planter.

2 Sheets—Sheet 2.

No. 21,287.

Patented Aug. 24, 1858.

UNITED STATES PATENT OFFICE.

HORACE WHITMAN, OF KINGSVILLE, OHIO.

IMPROVEMENT IN CORN-PLANTERS.

Specification forming part of Letters Patent No. 21,287, dated August 24, 1858.

*To all whom it may concern:*

Be it known that I, HORACE WHITMAN, of Kingsville, in the county of Ashtabula and State of Ohio, have invented new and useful Improvements in Corn-Planters; and I do hereby declare the following to be a full and complete description thereof, reference being had to the accompanying drawings, making part of this specification, and in which—

Figure 1:
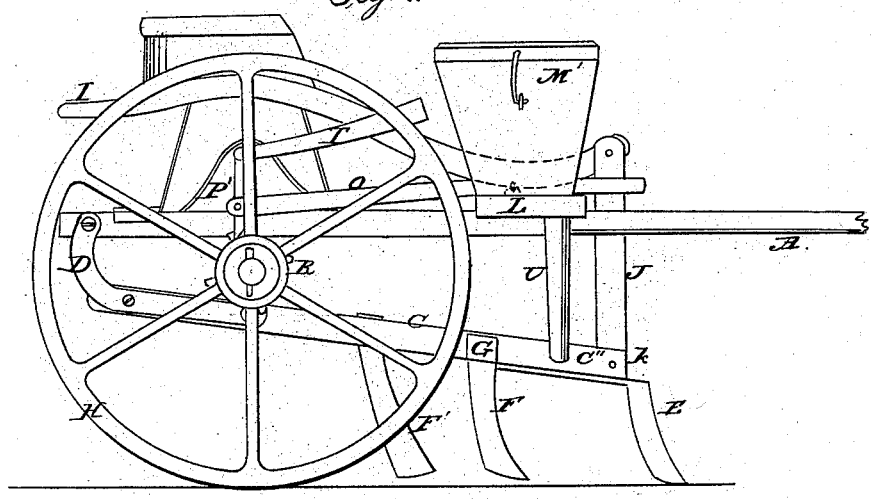
Figure 2:
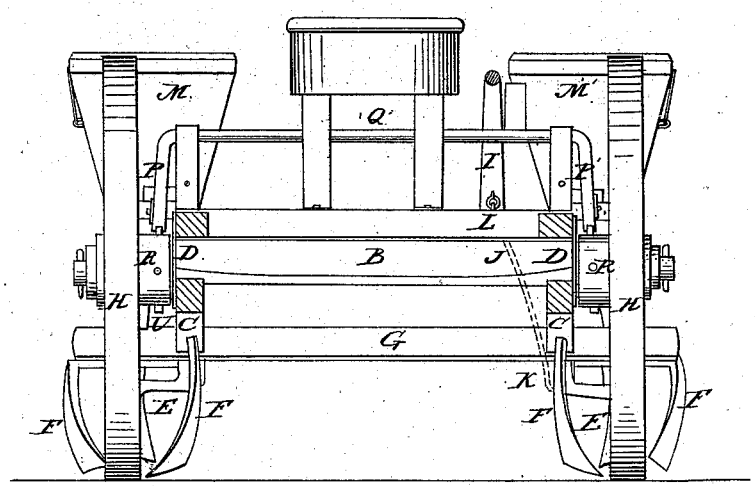

Figure 1 is a side elevation of my improved corn-planter; Fig. 2, an end view, seen from the rear; and Fig. 3, a top view.

Like letters refer to like parts in the different views.

The nature of my improvement consists in hinging the adjustable or articulating frame that carries the teeth and blades to the framework of the machine, and in the manner of elevating and depressing the frame and teeth, in combination with the means employed to distribute the grain at certain and definite distances.

Figure 3:
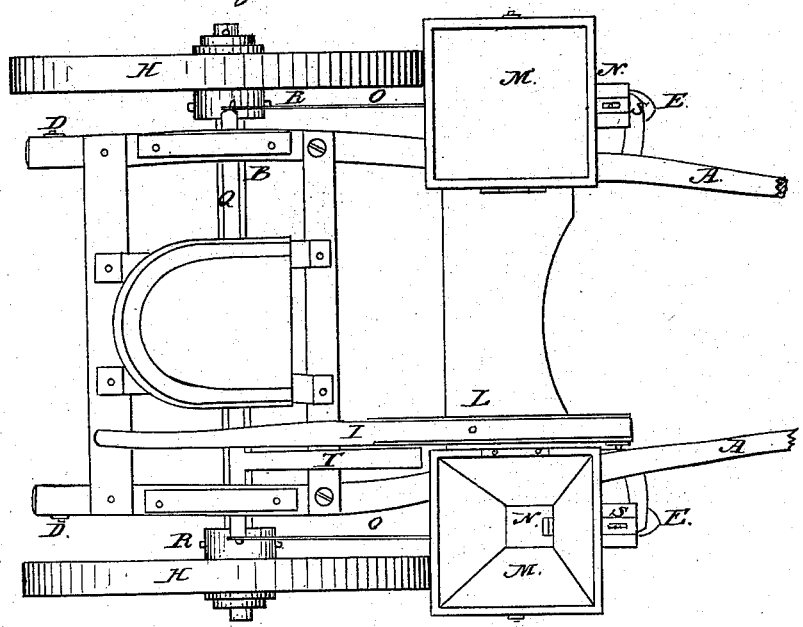

A, Figs. 1 and 3, represents the thills of the machine. These rest upon and are attached to the axle-tree B.

The frame C consists of the cross-bar G and the arms C'', that carry the teeth and blades, and are hinged to the hind end of the machine or the thills A, as seen at D.

The forward teeth, E, which cut the furrows into which the seeds are dropped, are attached to the forward end of the arms C'', as shown in Fig. 1.

The two teeth or blades that cover the seeds are shown at F F', Figs. 1 and 2. The blade seen at F is inserted into a cross-piece, G, which unites the arms C''. The blades F F' are so formed that they turn the soil toward the furrow cut by the tooth E, for the purpose of thereby covering the seed.

The two wheels H H', with their broad tread, pass over the furrows and smooth down the ridge left by the teeth E and blades F F'.

The depth to which the teeth E penetrate the soil is regulated by the lever I and connecting-rod J, which connects the short arm of the lever I with the forward end of one of the arms C'', as seen at K. The fulcrum of the lever I is indicated at L in the several figures. By depressing the long arm of the lever I the arms C'', tooth E, and blades F F' can be raised above the ground or their depth graduated, as may be desired.

The seeds to be planted are placed in the hoppers M M'. These are provided with slide-valves in the bottom, which are seen at N, Fig. 3, and the valve-rods at O, Figs. 1 and 3. These valves are worked by an arm, P P', upon the rock-shaft Q. The arm P, extending downward from the ends of the rock-shaft, is acted upon by pins R, inserted into the hubs of the wheels H H'. These pins can be more or less in number, according to the size of the wheel and the distance the hills are apart. The pins can be taken out at pleasure or inserted. They only need to be used in one wheel at a time, and every pin that comes into contact with the arms P P' moves the sliding valves simultaneously and discharges a certain quantity of seed from each hopper, and this seed is conveyed to the furrow by means of the spout U. This quantity is regulated by a slider, S, Fig. 3, which increases or diminishes the size of the seed-cup in the valve N. The valves are closed by means of the weighted lever T, which is rigidly attached to the rock-shaft Q. By depressing the lever I the tooth and blades are raised from the ground and the arms P P' thrown back beyond the reach of the pins R, so that the machine can be moved over the ground without working.

What I claim as my improvement, and desire to secure by Letters Patent, is—

The adjustable or articulating frame C, hinged to the machine, and provided with the teeth and blades, in combination with the rock-shaft Q, weighted lever T, and lever I, when arranged in relation to a seeding-machine, substantially in the manner and for the purpose specified.

H. WHITMAN.

Witnesses:
C. W. HEYWOOD,
D. E. CARTER.